(12) United States Patent
Benco et al.

(10) Patent No.: US 7,554,570 B2
(45) Date of Patent: Jun. 30, 2009

(54) NETWORK SUPPORT FOR REMOTE MOBILE PHONE CAMERA OPERATION

(75) Inventors: David S. Benco, Winfield, IL (US);
Sanjeev Mahajan, Naperville, IL (US);
Baoling S. Sheen, Naperville, IL (US);
Sandra L. True, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 715 days.

(21) Appl. No.: 11/157,780

(22) Filed: Jun. 21, 2005

(65) Prior Publication Data
US 2007/0002129 A1    Jan. 4, 2007

(51) Int. Cl.
*H04N 7/14* (2006.01)
*H04M 11/00* (2006.01)

(52) U.S. Cl. ............. 348/14.01; 348/14.02; 348/14.03; 455/556.1

(58) Field of Classification Search ... 348/14.01–14.16; 455/556.1, 556.2, 557; 379/102.01, 102.02, 379/102.03
See application file for complete search history.

(56) References Cited

U.S. PATENT DOCUMENTS

2004/0114731 A1 * 6/2004 Gillett et al. ............. 379/88.03

FOREIGN PATENT DOCUMENTS

JP           2003234938 A  *  8/2003

* cited by examiner

*Primary Examiner*—Melur Ramakrishnaiah

(57) ABSTRACT

An apparatus in one example has: a mobile terminal having a camera; a further terminal; a communication network operatively coupled to the mobile terminal and to the further terminal; the communication network having remote mobile phone camera operation functionality such that the further terminal in the communications network remotely controls the camera in the mobile terminal.

20 Claims, 3 Drawing Sheets

NETWORK SUPPORT FOR REMOTE MOBILE PHONE CAMERA OPERATION

TECHNICAL FIELD

The invention relates generally to telecommunication networks, and more particularly to remote mobile phone camera operation.

BACKGROUND

Wireless communication systems are constantly evolving. System designers are continually developing greater numbers of features for both service providers as well as for the end users. In the area of wireless phone systems, cellular based phone systems have advanced tremendously in recent years. Wireless phone systems are available based on a variety of modulation techniques and are capable of using a number of allocated frequency bands. Available modulation schemes include analog FM and digital modulation schemes using Time Division Multiple Access (TDMA) or Code Division Multiple Access (CDMA). Each scheme has inherent advantages and disadvantages relating to system architecture, frequency reuse, and communications quality. However, the features the manufacturer offers to the service provider and which the service provider offers to the consumer are similar between the different wireless systems.

Regardless of the modulation scheme in use, the wireless phone available to the end user has a number of important features. Nearly all wireless phones incorporate at least a keyboard for entering numbers and text, and a display that allows the user to display text, dialed numbers, pictures and incoming caller numbers. Additionally, wireless phones may incorporate cameras, electronic phonebooks, speed dialing, single button voicemail access, and messaging capabilities, such as e-mail.

Mobile subscribers are becoming increasingly connected to their mobile handsets which are often viewed as a necessary accessory. Also, the line between work life and personal life is increasingly blurred due to the workplace demands on many employees, combined with longer hours, flex-time schedules, etc. In many circumstances, mobile subscribers share a single mobile handset for their work related business and their personal life.

Very often subscribers misplace their phone or forget it somewhere and want to know where it is. Similarly, there are circumstances when the subscriber gets in an accident or is incapacitated and can't answer the phone to explain where they are. In these and other applications, it would be helpful if the subscriber, their family or law enforcement agencies could turn the mobile phone camera on and see the surroundings. However, such features and capabilities are not available in the known art.

Thus, there is a need in the art for an improved method and apparatus for remote mobile phone camera operation.

SUMMARY

The invention in one implementation encompasses an apparatus. The apparatus in one embodiment may comprise: a mobile terminal having a camera; a further terminal; a communication network operative coupled to the mobile terminal and to the further terminal; the communication network having remote mobile phone camera operation functionality such that the further terminal in the communications network remotely controls the camera in the mobile terminal.

The invention in a further implementation encompasses a method. The method in one embodiment may comprise: remotely controlling a camera of a mobile terminal by a further terminal in a communication network; and using a remote camera operation protocol that enables the further terminal to remotely control operation of the camera of the mobile terminal such that the further terminal turns on and off of the camera of the mobile terminal and such that the mobile terminal transfers at least one of a photo and video from the mobile terminal to the further terminal.

DESCRIPTION OF THE DRAWINGS

Features of exemplary implementations of the invention will become apparent from the description, the claims, and the accompanying drawings in which:

DETAILED DESCRIPTION

Embodiments of the present method and apparatus enables a communications network to verify that a party trying to remotely turn on or off a mobile phone camera or mobile phone video camera is authorized to do so. Thus, only authorized parties may remotely turn on or off a mobile phone camera or mobile phone video camera. Although there may be situations in which authorization may not be necessary, it is obviously very important to insure the confidentiality of subscribers that use mobile phone photo cameras or mobile phone video cameras. Embodiments of the present method and apparatus further enable the communications network to deliver a photo or video taken by the mobile phone photo camera or mobile phone video camera to the authorized party. The mobile phone with a photo camera may also be referred to as cell phone with a built in camera, a mobile camera, a camera cell phone, a photo camera, and a camera having the ability to send photos over a communications network, such as the Internet. The mobile phone with a video camera may also be referred to as cell phone with a built in video camera, a mobile video camera, a video cell phone, a video camera, and a camera having the ability to send video over a communications network, such as the Internet. In general, all of the above devices may be referred to as a mobile terminal that has a functionality that enables the taking and sending of photos and videos.

Figure 1:
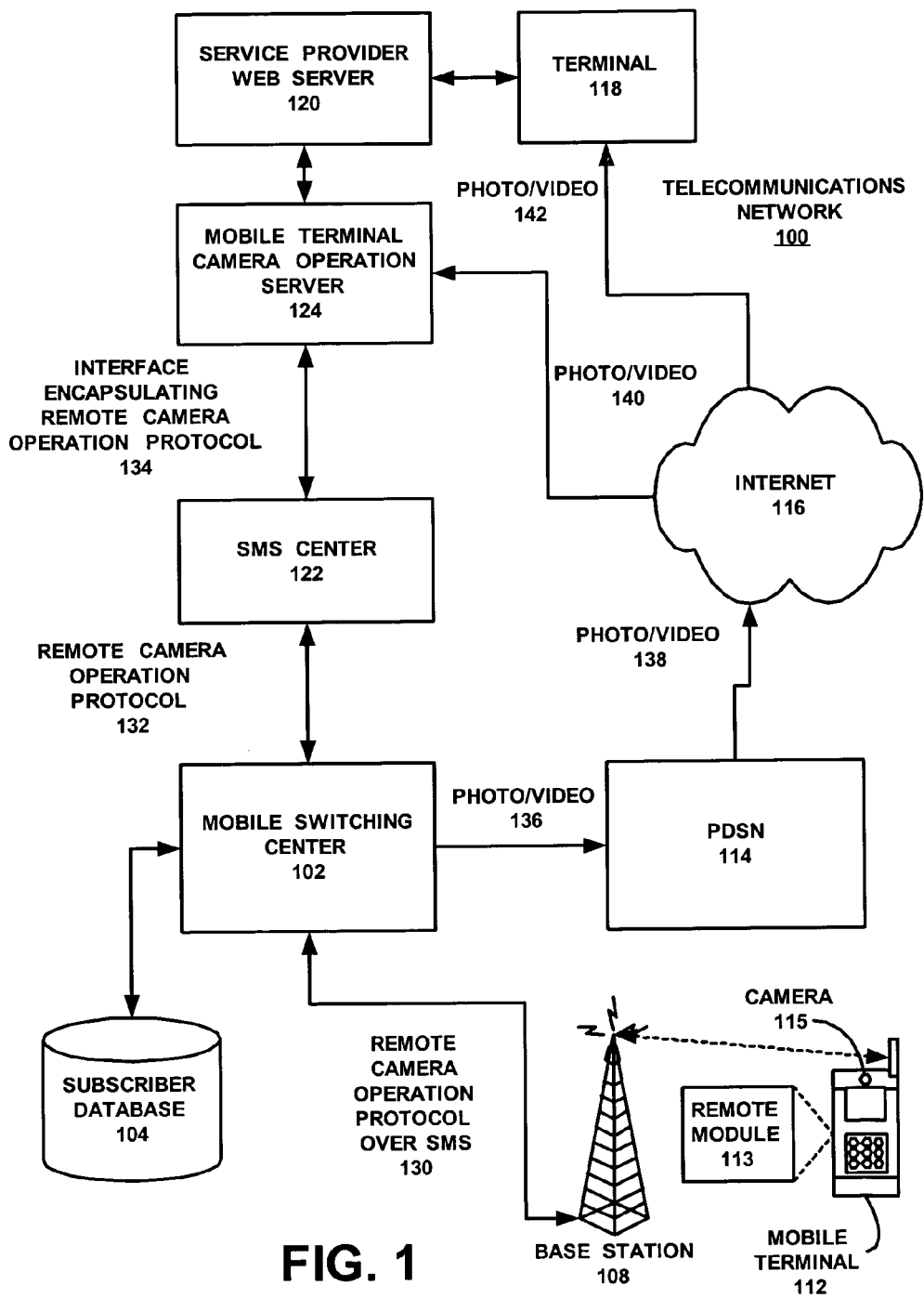
FIG. 1 is a representation of one implementation of an apparatus that provides network support for remote mobile phone camera operation using SMS (short message service) for protocol transport.

FIG. 1 is a representation of one implementation of an apparatus that provides network support for remote mobile phone camera/video operation using SMS (short message service) for protocol transport is a representation of one implementation of an apparatus that provides network support for lost call alerting.

A telecommunications network 100 may have a mobile switching center (MSC) 102. The network 100 may be, or may be part of, one or more of a telephone network, a local area network ("LAN"), the Internet, and a wireless network. In the depicted embodiment, a packet data service node (PDSN) 114 and a SMS center 122 may be connected to the MSC 102. The MSC 102 may send photos and video 136 to the PDSN 114 and may communicate with the SMS center 122 using a remote camera operation protocol 132. The PDSN 114 may route photos and video 138 to the Internet 116.

The Remote Camera Operation Protocol provides messages for the following:

Turn camera On Request—Sent by 124 to request that the Photo/Video Camera be turned on;

Turn camera On Acknowledgement—Sent by 113 to acknowledge that the Camera has been turned on in response to the received request;

Snap Photo Request—Sent by 124 to request the Camera to SNAP a Photo;

Snap Photo Acknowledgement—Sent by 113 to acknowledge that the photo has been snapped (This will also include the reference number of the photo snapped);

Shoot Video Request—Sent by 124 to request the Video Camera to shoot a video and the duration of shooting the video;

Shoot Video Acknowledgement:—Sent by 113 to acknowledge that the Video has been shot (This will come after the duration of the video and include a reference number of the video.);

Transmit Photo/video Request:—Sent by 124 to request the terminal to transmit the photo to the network (This request may specify reference number of the photo/video to be send, the method (ftp, email) to be used for transmitting, the URL/E-Mail of the entity to which the photo is to be sent, the name that the photo/video should be given when it is sent);

Transmit Photo/Video Response—Acknowledgement by 113 that it has processed the Transmit Photo/Video Request Successfully;

Turn camera Off Request—Sent by 124 to request that the Photo/Video Camera be turned off; and Turn camera Off Acknowledgement—Sent by 113 to acknowledge that the Camera has been turned off in response to the received request.

The MSC 102 may also be connected to at least one base station (BS) 108. The base station 108 communicates with the mobile terminal 112 in its service area using a subscriber database 104. The mobile terminal 112 may be equipped with a camera 115, and the camera 115 may be at least one of a photo camera and a video camera.

The SMS center 122 may also be operatively coupled to a mobile terminal camera operation server 124 via an interface encapsulating remote camera operation protocol 134. The mobile terminal camera operation server 124 may also be operatively coupled to the Internet 116 for transfer of photos and videos 140.

A service provider web server 120 may be operatively coupled to the mobile terminal camera operation server 124 and to a further terminal 118. The further terminal 118 may receive photos and videos 142 from the Internet 116.

The communication network 100 thus has remote mobile phone camera operation functionality such that the further terminal 118 in the communications network 100 remotely controls the camera 115 in the mobile terminal 112. The remote mobile phone camera operation functionality may be implemented, for example, by a remote module 113 in the mobile terminal 112, and the mobile terminal camera operation server 124 in the communications network 100.

The remote module 113 may be implemented in software, hardware, or a combination of software and hardware. The remote module 113 may process requests and provide the responses as specified in the Remote Camera Operation Protocol 134. Additionally, the remote module 113 may interface with the photo/video camera hardware using the existing firmware and software that controls the photo/video camera. Using the capabilities provided by the photo/video camera firmware and software, The remote module 113 may carry out the operations of turning on the photo/video camera, snapping a photo and/or shooting a video and sending the photo/video to the requested entity to which the photo/video is to be sent.

Figure 2:
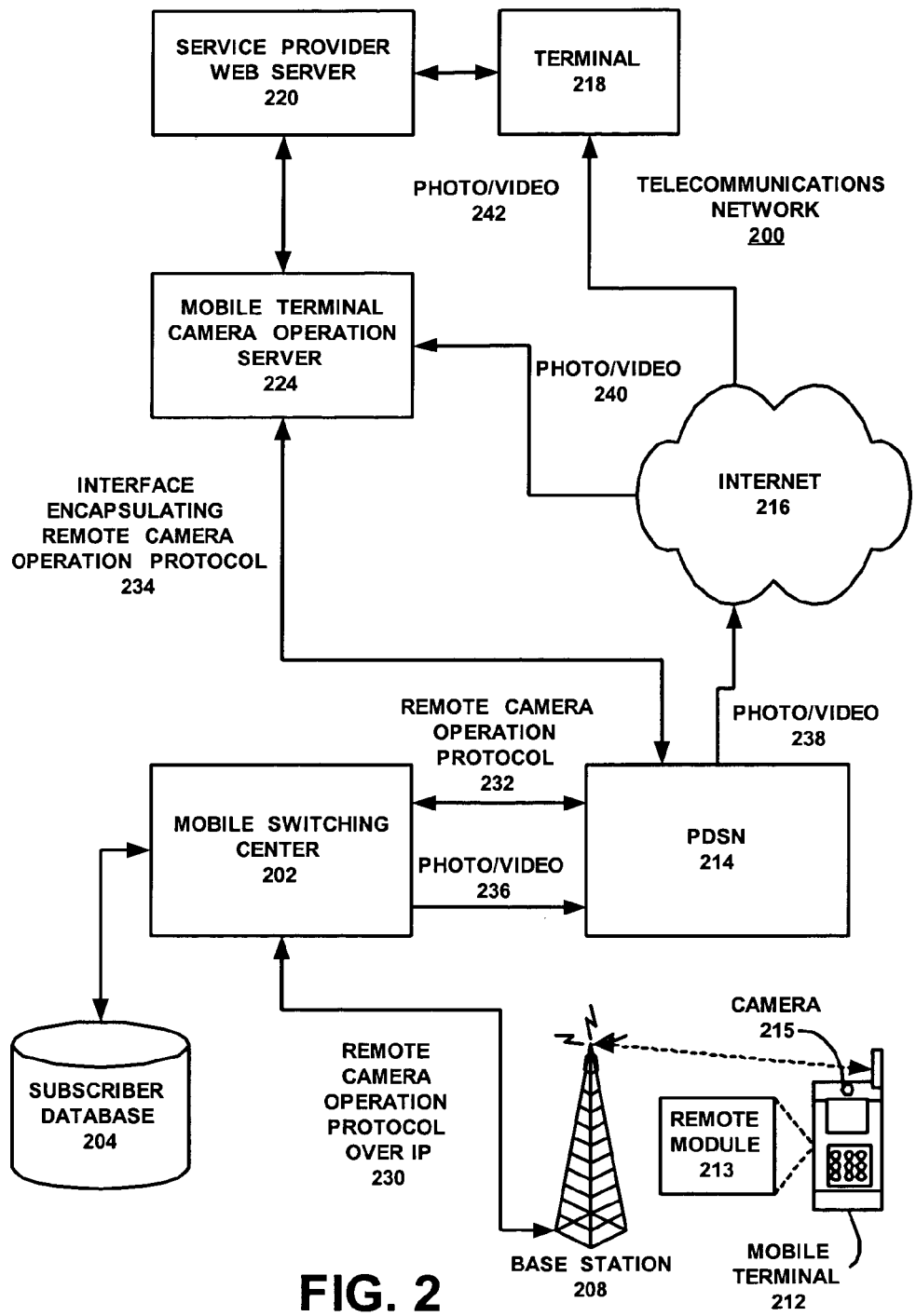
FIG. 2 is a representation of one implementation of an apparatus that provides network support for remote mobile phone camera operation using IP (Internet protocol) for protocol transport.

FIG. 2 is a representation of one implementation of an apparatus that provides network support for remote mobile phone camera/video operation using IP (Internet protocol) for protocol transport.

A telecommunications network 200 may have a mobile switching center (MSC) 202. The network 200 may be, or may be part of, one or more of a telephone network, a local area network ("LAN"), the Internet, and a wireless network. In the depicted embodiment, a packet data service node (PDSN) 214 may be connected to the MSC 202. The MSC 202 may send photos and video 236 to the PDSN 214 and may communicate with the PDSN 214 using a remote camera operation protocol 232. The PDSN 214 may route photos and video 238 to the Internet 216.

The MSC 202 may also be connected to at least one base station (BS) 208. The base station 208 communicates with the mobile terminal 212 in its service area using a subscriber database 204. The mobile terminal 212 may be equipped with a camera 215, and the camera 215 may be at least one of a photo camera and a video camera.

The PDSN 214 may also be operatively coupled to a mobile terminal camera operation server 224 via an interface encapsulating remote camera operation protocol 234. The mobile terminal camera operation server 224 may also be operatively coupled to the Internet 216 for transfer of photos and videos 240.

A service provider web server 220 may be operatively coupled to the mobile terminal camera operation server 224 and to a further terminal 218. The further terminal 218 may receive photos and videos 242 from the Internet 216.

The communication network 200 thus has remote mobile phone camera operation functionality such that the further terminal 218 in the communications network 200 remotely controls the camera 215 in the mobile terminal 212. The remote mobile phone camera operation functionality may be implemented, for example, by a remote module 213 in the mobile terminal 212, and the mobile terminal camera operation server 224 in the communications network 200.

The remote module 213 may be implemented in software, hardware, or a combination of software and hardware as described above.

The present method and apparatus may have a wide variety of embodiments. In one exemplary embodiment of the present method and apparatus, the subscriber, family member or law enforcement agency may gain access to the camera/video camera of the mobile terminal (typically a camera equipped cell phone) by going to the service provider's web site. The web site may provide a new service to gain access to the camera/video camera of the mobile terminal. The service may have authenticated access. The access in one embodiment may be authenticated using the same authentication mechanism that is used to authenticate access to online account information. The law enforcement agency may have a super user access ID (identification) that may be used in the event of an emergency.

Once the user gains access to the "Remote Camera/Video Camera Operation Service" via the Internet, for example, the user would be able to turn the camera/video camera of the mobile terminal on or off, snap a photo or capture a short video and have it transmitted back to the user.

The request to turn the camera/video camera on or off of the mobile terminal, snap a photo or capture a short video or instruct the mobile terminal to transmit the photo/video to the user may be transmitted over the air using a new "Remote Camera/Video Operation" protocol. The protocol may be carried over SMS or Packet Data. In general, the Remote Camera/Video Operation protocol may have at least the following operations: turn camera on; turn camera off; snap a photo; turn video camera on; turn video camera off; start video capture; stop video capture; specify destination for sending photo/video; and send photo/video.

Once instructed to do so, the mobile terminal may transmit the photo or video using packet data service to the service provider's Remote Camera/Video Camera Operation server or to a user specified email address.

If the destination specified is the service provider's Remote Camera/Video Camera Operation server, a "Remote Camera/Video Camera Operation Service" application may prompt the user when the snapshot photo or video is available for viewing.

The user may view the photo or video using the Remote Camera/Video Camera Operation Service application or may view the photo on their email account.

Figure 3:
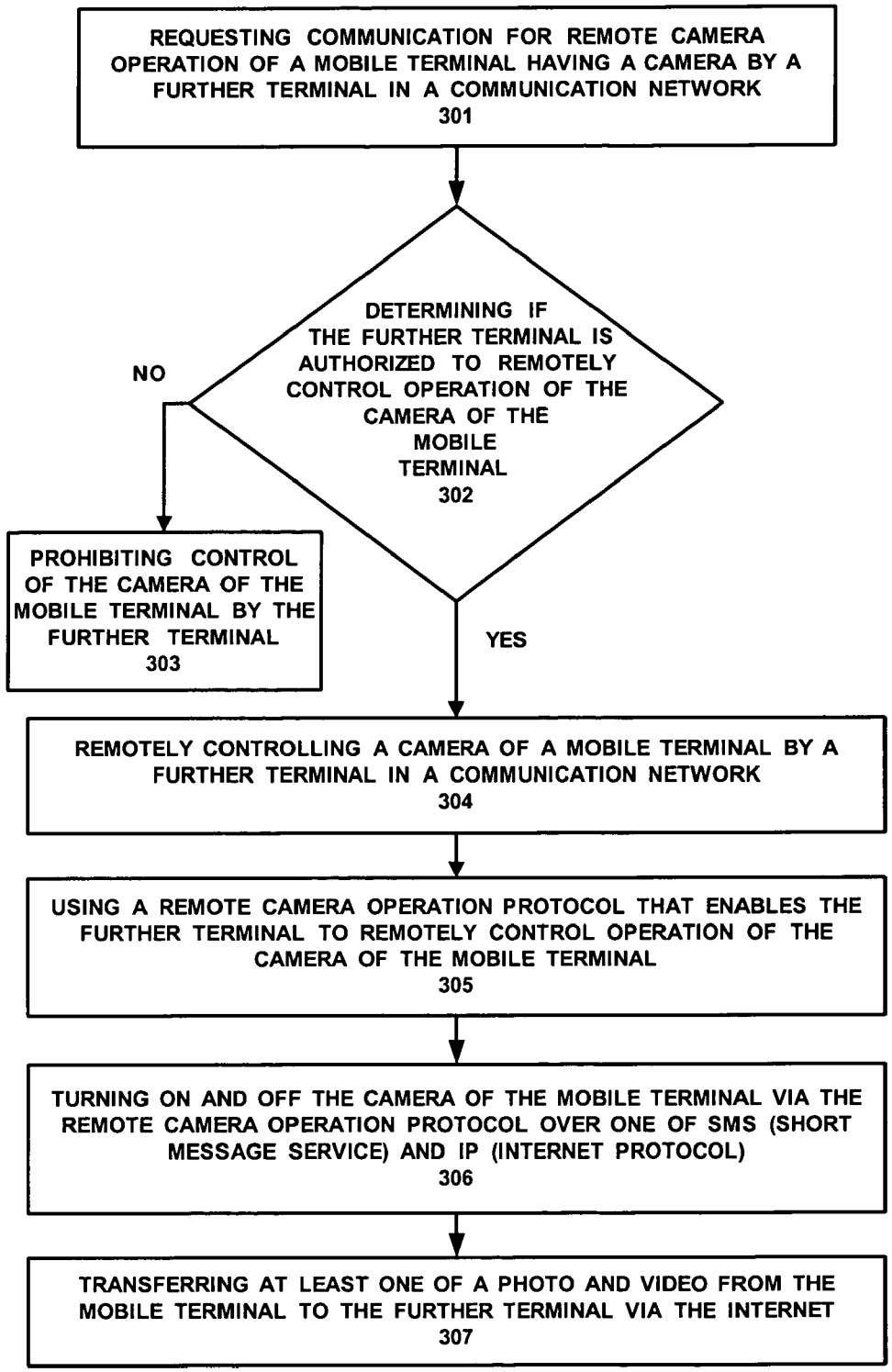
FIG. 3 is a representation of one exemplary flow diagram for remote mobile phone camera operation according to the present method.

FIG. 3 is a representation of one exemplary flow diagram for remote mobile phone camera/video operation according to the present method. This method may have the following steps: requesting communication for remote camera operation of a mobile terminal having a camera by a further terminal in a communication network (301); determining if the further terminal is authorized to remotely control operation of the camera of the mobile terminal (302); if the further terminal is not authorized, prohibiting control of the camera of the mobile terminal by the further terminal (303); if the further terminal is authorized, remotely controlling a camera of a mobile terminal by a further terminal in a communication network (304); using a remote camera operation protocol that enables the further terminal to remotely control operation of the camera of the mobile terminal (305); turning on and off the camera of the mobile terminal via the remote camera operation protocol over one of SMS (short message service) and IP (Internet protocol) (306); and transferring at least one of a photo and video from the mobile terminal to the further terminal via the Internet (307).

Embodiments of the present method and apparatus overcome the drawbacks of the prior art and allows an authorized user (such as, a family member or law enforcement agencies) to turn the mobile phone camera on and view the surroundings.

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. The computer-readable signal-bearing medium in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus comprising:
   a mobile terminal having a camera;
   a further terminal;
   a communication network operative coupled to the mobile terminal and to the further terminal; and
   the communication network having remote mobile phone camera operation functionality such that the further terminal in the communications network remotely controls the camera in the mobile terminal; and
   the communication network having a Remote Camera/Video Camera Operation server that has a Remote Camera/Video Camera Operation Service application;
   wherein once instructed by the further terminal, the mobile terminal transmits a photo or video using packet data service to one of the service provider Remote Camera/Video Camera Operation server and a user specified email address;
   wherein if a destination specified is the service provider Remote Camera/Video Camera Operation server, the Remote Camera/Video Camera Operation Service application prompts the further terminal when a photo or video is available for viewing; and
   wherein the photo or video is viewed via one of the Remote Camera/Video Camera Operation Service application and the user specified email address.

2. The apparatus according to claim 1, wherein the camera is at least one of a photo camera and a video camera.

3. The apparatus according to claim 1, wherein the further terminal is one of a further mobile terminal and a non-mobile terminal.

4. The apparatus according to claim 1, wherein the remote mobile phone camera operation functionality comprises a remote module in the mobile terminal, and a mobile terminal camera operation server in the communications network.

5. The apparatus according to claim 1, wherein the apparatus further comprises a remote camera operation protocol that enables the further terminal to remotely control operation of the camera of the mobile terminal.

6. The apparatus according to claim 1, wherein the remote camera operation protocol is communicated over one of SMS (short message service) and IP (Internet protocol).

7. The apparatus according to claim 6, wherein the remote camera operation protocol is structured such that the further terminal turns on and off of the camera of the mobile terminal and such that the mobile terminal transfers at least one of a photo and video from the mobile terminal to the further terminal.

8. The apparatus according to claim 7, wherein the remote camera operation protocol is further structured to determine if the further terminal is authorized to remotely control operation of the camera of the mobile terminal.

9. An apparatus comprising:
a mobile terminal having a camera;
a further terminal;
a communication network operative coupled to the mobile terminal and to the further terminal;
the communication network having a mobile switching center operatively coupled to the mobile terminal, the mobile terminal having a remote module, and having a mobile terminal camera operation server operatively coupled to the further terminal;
remote mobile phone camera operation functionality such that the further terminal in the communications network remotely controls the camera in the mobile terminal;
the remote mobile phone camera operation functionality comprises a remote module in the mobile terminal, and a mobile terminal camera operation server in the communications network; and
a remote camera operation protocol that enables the further terminal to remotely control operation of the camera of the mobile terminal;
the communication network having a Remote Camera/Video Camera Operation server that has a Remote Camera/Video Camera Operation Service application;
wherein once instructed by the further terminal, the mobile terminal transmits a photo or video using packet data service to one of the service provider Remote Camera/Video Camera Operation server and a user specified email address;
wherein if a destination specified is the service provider Remote Camera/Video Camera Operation server, the Remote Camera/Video Camera Operation Service application prompts the further terminal when a photo or video is available for viewing; and
wherein the photo or video is viewed via one of the Remote Camera/Video Camera Operation Service application and the user specified email address.

10. The apparatus according to claim 9, wherein the camera is at least one of a photo camera and a video camera.

11. The apparatus according to claim 9, wherein the further terminal is one of a further mobile terminal and a non-mobile terminal.

12. The apparatus according to claim 9, wherein the remote camera operation protocol is structured such that the further terminal turns on and off of the camera of the mobile terminal and has the mobile terminal transfer at least one of a photo and video from the mobile terminal to the further terminal.

13. The apparatus according to claim 12, wherein the remote camera operation protocol is further structured to determine if the further terminal is authorized to remotely control operation of the camera of the mobile terminal.

14. A method, comprising:
remotely controlling a camera of a mobile terminal by a further terminal in a communication network; and
using a remote camera operation protocol that enables the further terminal to remotely control operation of the camera of the mobile terminal such that the further terminal turns on and off of the camera of the mobile terminal and such that the mobile terminal transfers at least one of a photo and video from the mobile terminal to the further terminal;
the communication network having a Remote Camera/Video Camera Operation server that has a Remote Camera/Video Camera Operation Service application;
wherein once instructed by the further terminal, the mobile terminal transmits a photo or video using packet data service to one of the service provider Remote Camera/Video Camera Operation server and a user specified email address;
wherein if a destination specified is the service provider Remote Camera/Video Camera Operation server, the Remote Camera/Video Camera Operation Service application prompts the further terminal when a photo or video is available for viewing; and
wherein the photo or video is viewed via one of the Remote Camera/Video Camera Operation Service application and the user specified email address.

15. The method according to claim 14, wherein the camera is at least one of a photo camera and a video camera.

16. The method according to claim 14, wherein the further terminal is one of a further mobile terminal and a non-mobile terminal.

17. The method according to claim 14, wherein the remote camera operation protocol is communicated over one of SMS (short message service) and IP (Internet protocol).

18. The method according to claim 14, wherein the remote camera operation protocol further comprises determining if the further terminal is authorized to remotely control operation of the camera of the mobile terminal.

19. The method according to claim 14, wherein the method further comprises:
turning on and off the camera of the mobile terminal via the remote camera operation protocol over one of SMS (short message service) and IP (Internet protocol); and
transferring at least one of a photo and video from the mobile terminal to the further terminal via the Internet.

20. The apparatus according to claim 14, wherein the further terminal is one of a further mobile terminal and a non-mobile terminal.

* * * * *